US010807606B2

(12) United States Patent
Yang et al.

(10) Patent No.: US 10,807,606 B2
(45) Date of Patent: Oct. 20, 2020

(54) APPARATUS AND METHOD FOR LEAN INSPECTION OF VEHICLE

(71) Applicants: HYUNDAI MOTOR COMPANY, Seoul (KR); KIA MOTORS CORPORATION, Seoul (KR)

(72) Inventors: Changmo Yang, Chungju-si (KR); Haeseong Lee, Anyang-si (KR); Jihoon Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 193 days.

(21) Appl. No.: 16/174,560

(22) Filed: Oct. 30, 2018

(65) Prior Publication Data

US 2019/0322284 A1 Oct. 24, 2019

(30) Foreign Application Priority Data

Apr. 24, 2018 (KR) .......................... 10-2018-0047134

(51) Int. Cl.
*B60W 40/112* (2012.01)
*G07C 5/06* (2006.01)
(Continued)

(52) U.S. Cl.
CPC ......... *B60W 40/112* (2013.01); *B62D 15/021* (2013.01); *G07C 5/008* (2013.01);
(Continued)

(58) Field of Classification Search
CPC ....... B60W 2520/125; B60W 2520/28; B60W 2530/18; B60W 2540/18; B60W 2552/15;
(Continued)

(56) References Cited

U.S. PATENT DOCUMENTS 8,788,176 B1 * 7/2014 Yopp .................... B60W 30/162
701/96
10,068,389 B1 * 9/2018 Strege ................. G01M 17/007
(Continued)

FOREIGN PATENT DOCUMENTS

| KR | 10-0820194 B1 | 4/2008 |
|---|---|---|
| KR | 10-2015-01277351 A | 11/2015 |
| KR | 10-1776568 B1 | 9/2017 |

*Primary Examiner* — Babar Sarwar
(74) *Attorney, Agent, or Firm* — Brinks Gilson & Lione

(57) ABSTRACT

A vehicle lean inspection apparatus that determines whether a vehicle is leaning during a driving test, includes: a communication module connected to a diagnostic communication module through an OBD-II connector of the vehicle to collect state information of driving of the vehicle; an acceleration sensor to measure an acceleration signal generated by a vertical vibration during driving of the vehicle to recognize a start point and an end point of an inspection interval of a predetermined reference distance; a gyro sensor to measure a road slope during the driving of the vehicle; and a controller to collect state information of the vehicle to measure an actual driving distance passing through the inspection interval, and to determine that the vehicle leans when the remaining driven distance calculated based on a first distance increment and a second distance increment exceeds the reference distance.

19 Claims, 7 Drawing Sheets

(51) Int. Cl.
*B62D 15/02* (2006.01)
*G07C 5/00* (2006.01)

(52) U.S. Cl.
CPC .......... *G07C 5/06* (2013.01); *B60W 2520/125* (2013.01); *B60W 2520/28* (2013.01); *B60W 2530/18* (2013.01); *B60W 2540/18* (2013.01); *B60W 2552/15* (2020.02); *B60W 2552/35* (2020.02)

(58) Field of Classification Search
CPC ............ B60W 2552/35; B60W 40/112; B62D 15/021; G01M 17/007; G01M 17/06; G07C 5/008; G07C 5/06; G07C 5/0808; G07C 5/0816
See application file for complete search history.

(56) References Cited

U.S. PATENT DOCUMENTS

| | | | | |
|---|---|---|---|---|
| 2005/0045398 A1* | 3/2005 | Suzuki | ................... | B62K 11/00 180/209 |
| 2009/0051135 A1* | 2/2009 | Lohmuller | ........... | B62D 15/021 280/124.1 |
| 2011/0190984 A1* | 8/2011 | Reeve | ................... | B62D 5/0481 701/41 |
| 2013/0030720 A1* | 1/2013 | Schulte | ................. | G01M 17/06 702/41 |
| 2013/0082874 A1* | 4/2013 | Zhang | .................... | G08G 1/163 342/357.31 |
| 2013/0253767 A1* | 9/2013 | Lee | ...................... | B60W 50/04 701/42 |
| 2014/0145498 A1* | 5/2014 | Yamakado | ........... | B60W 10/08 303/3 |
| 2014/0188331 A1* | 7/2014 | Amirpour | .............. | G07C 5/008 701/31.4 |
| 2014/0214265 A1* | 7/2014 | Ashton | ................. | G07C 5/0816 701/33.5 |
| 2014/0379200 A1* | 12/2014 | Yagi | ....................... | G05B 15/02 701/29.4 |
| 2015/0210282 A1* | 7/2015 | Fairgrieve | ........... | F16H 61/0213 701/93 |
| 2015/0232093 A1* | 8/2015 | Fairgrieve | ............... | B60T 8/175 701/90 |
| 2015/0239442 A1* | 8/2015 | Yamakado | ........... | B60W 40/114 701/70 |
| 2015/0291210 A1* | 10/2015 | Kageyama | ............... | B62D 5/04 701/41 |
| 2016/0377508 A1* | 12/2016 | Perrone | ................. | B60W 10/20 180/204 |
| 2017/0088163 A1* | 3/2017 | West | .................... | B62D 5/0457 |
| 2017/0166242 A1* | 6/2017 | Konieczny | ............. | B62D 6/002 |
| 2017/0316134 A1* | 11/2017 | Hyodo | .................... | G06F 30/33 |
| 2017/0372532 A1* | 12/2017 | Merg | ..................... | G06Q 10/20 |
| 2018/0089911 A1* | 3/2018 | Rath | ...................... | G06Q 50/30 |
| 2018/0229726 A1* | 8/2018 | Ikeda | ..................... | B60W 10/18 |
| 2018/0265156 A1* | 9/2018 | Hara | ...................... | G05D 3/125 |
| 2018/0266920 A1* | 9/2018 | Kim | ....................... | G01S 19/41 |
| 2018/0290684 A1* | 10/2018 | Suda | ..................... | B60G 17/0162 |
| 2019/0054966 A1* | 2/2019 | Park | ....................... | G07C 5/006 |
| 2019/0063913 A1* | 2/2019 | Leone | .................... | B60W 50/14 |
| 2019/0118831 A1* | 4/2019 | Mimura | ................. | G05D 1/0088 |
| 2019/0135264 A1* | 5/2019 | Shin | ....................... | B60K 6/442 |
| 2019/0278300 A1* | 9/2019 | Katsuki | ................ | B62M 7/04 |
| 2019/0286134 A1* | 9/2019 | Niesen | .................. | B60W 30/10 |
| 2020/0079365 A1* | 3/2020 | Choi | ..................... | B60W 30/09 |
| 2020/0079425 A1* | 3/2020 | Eilers | ................. | B62D 15/0245 |

* cited by examiner

→ Lean check due to road slope

APPARATUS AND METHOD FOR LEAN INSPECTION OF VEHICLE

CROSS-REFERENCE TO RELATED APPLICATION

This application claims priority to and the benefit of Korean Patent Application No. 10-2018-0047134, filed on Apr. 24, 2018, the entire contents of which are incorporated herein by reference.

FIELD

The present disclosure relates to a vehicle lean inspection apparatus and a method for a leaning test of a vehicle.

BACKGROUND

The statements in this section merely provide background information related to the present disclosure and may not constitute prior art.

Generally, in a vehicle manufacturing plant, it is determined whether or not a vehicle is leaning through a driving test to check a setting state of a steering wheel and wheel alignment.

For example, FIG. 1 illustrates a schematic view of a conventional vehicle lean inspection method.

Referring to FIG. 1, according to the conventional vehicle lean evaluation criteria, in a state of not holding the steering wheel of the vehicle, after the vehicle drives at a constant speed of 80 Km/h for 100 m, when the vehicle deviates more than a certain distance (for example, 1 m) to the left or right side, it is determined that the vehicle has leaned.

The term "not holding the steering wheel" means a condition in which an operator does not operate the steering wheel while driving, which means that the vehicle straightly travels while maintaining a steering angle of the steering wheel at a reference zero degrees.

However, in the conventional vehicle lean inspection method, an incorrect inspection may occur due to an operation of a steering wheel by an operator during a driving inspection, and there is a problem that it is impossible to quantify the inspection due to the operator's sensitivity evaluation.

Another typical method of inspecting the vehicle lean is using line laser sensors.

In the inspection method using the line laser sensors, the line laser sensors are arranged on respective sides of a road, and a distance between a line laser sensor and a vehicle traveling on an inspection zone is measured to detect a vehicle lean due to distance variation therebetween.

However, we have discovered that since the inspection method using the line laser sensors requires installation of the line laser sensors at 100 m driving intervals, excessive installation cost and maintenance cost are increased. In addition, since it is difficult to check whether or not the operator is operating the steering wheel, there is a disadvantage that the problem of inspection failure due to human error cannot be solved.

The above information disclosed in this Background section is only for enhancement of understanding of the background of the present disclosure and therefore it may contain information that does not form the prior art that is already known to a person of ordinary skill in the art.

SUMMARY

The present disclosure provides a lean inspection apparatus of a vehicle and a method to determine a vehicle lean by comparing a remaining distance with a reference distance. In particular, the remaining distance is calculated by subtracting a first distance increment amount due to a steering wheel operation and a second distance increment amount due to road inclination from an actual driving distance of a vehicle passing through an inspection interval in which the reference distance is set. In an exemplary form of the present disclosure, a vehicle lean inspection apparatus, which determines whether a vehicle is leaning during a driving test, includes: a communication module configured to be connected to a diagnostic communication module through an OBD-II connector of the vehicle to collect state information according to driving of the vehicle; an acceleration sensor configured to measure an acceleration signal generated by a vertical vibration during driving of the vehicle to determine a start point and an end point of an inspection interval of a predetermined reference distance; a gyro sensor configured to measure a road slope during the driving of the vehicle; and a controller configured to receive state information of the vehicle and to measure an actual driving distance passing through the inspection interval and configured to determine that the vehicle leans when a remaining driven distance exceeds a reference distance. In particular, the remaining driven distance is calculated by subtracting a first distance increment due to an operation of a steering wheel and a second distance increment due to the road slope from the actual driving distance.

The state information may include a steering angle of the steering wheel, and speed values of four wheel speed sensors of the vehicle. In one form, a first speed bump is formed at the start point of the inspection interval and a second speed bump is formed at the end point of the inspection interval. In particular, the controller is configured to determine the start point and the end point of the inspection interval using the acceleration sensor configured to measure acceleration signals when the vehicle passes over the first and second speed bumps, and the controller calculates a driving time in which the vehicle passes through the inspection interval based on the measured acceleration signals.

The controller may derive an average speed value of the speed values of the four wheel speed sensors of the vehicle collected during the driving time.

The controller may calculate the actual driving distance by multiplying the driving time by the average speed value.

The controller may compare the each speed value of the four wheel speed sensors with the average speed value of the four wheel speed sensors when the vehicle is determined as being leaning, and the controller is configured to calculate a deviation between each speed value and the average speed value of the four wheel speed sensors and to diagnose a wheel alignment failure based on the calculated deviations.

The vehicle penetration test apparatus may further includes: a power module configured to receive power through the OBD-II connector and supply the power for driving the vehicle lean inspection apparatus; a wireless communication module configured to transmit inspection information of the vehicle to an external inspection server; a display module configured to display the inspection information via at least one of a visual signal and an auditory signal; and a storage module configured to store a first distance variation map according to a steering angle change of the steering wheel and a second distance variation map according to a road slope change.

The controller may collect the steering angle change of the steering wheel during the driving time in which the vehicle passes through the inspection interval, and may derive the first distance increment according to the steering angle change with reference to the first distance variation map.

The controller may collect the road slope change during the driving time in which the vehicle passes through the inspection interval, and may derive the second distance increment according to the slope change with reference to the second distance variation map.

Hardware and software of the vehicle lean inspection apparatus may be additionally installed in a wireless OBD device.

The controller may further collect a lateral acceleration of the vehicle, derive a third distance increment due to a change of the lateral acceleration, and subtract the third distance increment from the actual driving distance.

Another exemplary form of the present disclosure provides a vehicle leaning inspection method that determines whether a vehicle is leaning during a driving test of the vehicle by using a lean inspection apparatus connected to an OBD-II connector of the vehicle, including: a) when an entrance of an inspection start point of the vehicle is recognized, collecting state information of the vehicle and measuring a road slope through a gyro sensor; b) deriving a first distance increment according to a change of a steering angle of a steering wheel of the vehicle, and deriving a second distance increment according to a change of the road slope; c) when the passing of an inspection end point of the vehicle is recognized, deriving an actual driving distance that the vehicle has driven through a reference inspection interval by multiplying a driving time by an average speed of the vehicle; and d) determine that the vehicle leans when the remaining driven distance obtained by subtracting the first distance increment and the second distance increment from the actual driving distance exceeds a reference distance.

The entrance of the inspection start point and the passing of the inspection end point of the vehicle may be recognized by detecting acceleration signals generated when front and rear wheels of the vehicle respectively pass through the inspection start point and the inspection end point at which respective speed bumps are formed.

The step b) may include: collecting the steering angle of the steering wheel and checking whether the steering angle is changed with respect to a zero (0) degrees; and deriving the first distance increment with reference to the first distance variation map according to the change of the steering angle of the steering wheel when the steering angle is changed.

The step b) may include: measuring a slope of a road on which the vehicle is driving through the gyro sensor; and deriving the second distance increment with reference to a second distance variation map according to the change of the road slope when the road slope is changed.

The step c) may include deriving an average speed value of the speed values of the four wheel speed sensors of the vehicle collected during the driving time.

The step d) may include calculating a deviation between each speed value and the average speed value of the four wheel speed sensors, and diagnosing a failure of a wheel alignment based on the calculated deviations.

The reference distance may be compared with the remaining driving distance with a permissible range of a predetermined length.

The vehicle lean inspection method may further include, after the step d), transmitting a determination result of the leaning of the vehicle to an external inspection server through wireless communication.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
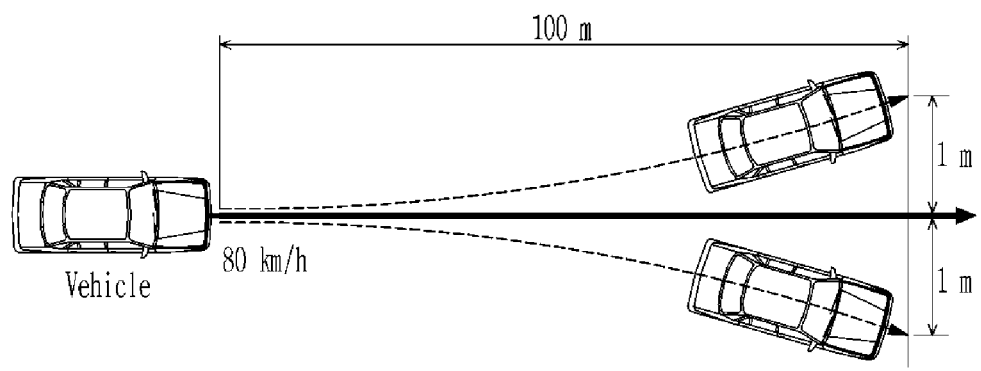
FIG. 1 illustrates a schematic view of a conventional vehicle lean inspection method.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration. As those skilled in the art would realize, the described forms may be modified in various different ways, all without departing from the spirit or scope of the present disclosure.

In the present specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Hereinafter, a vehicle lean inspection apparatus and method according to an exemplary form of the present disclosure will be described in detail with reference to the accompanying drawings.

Figure 2:
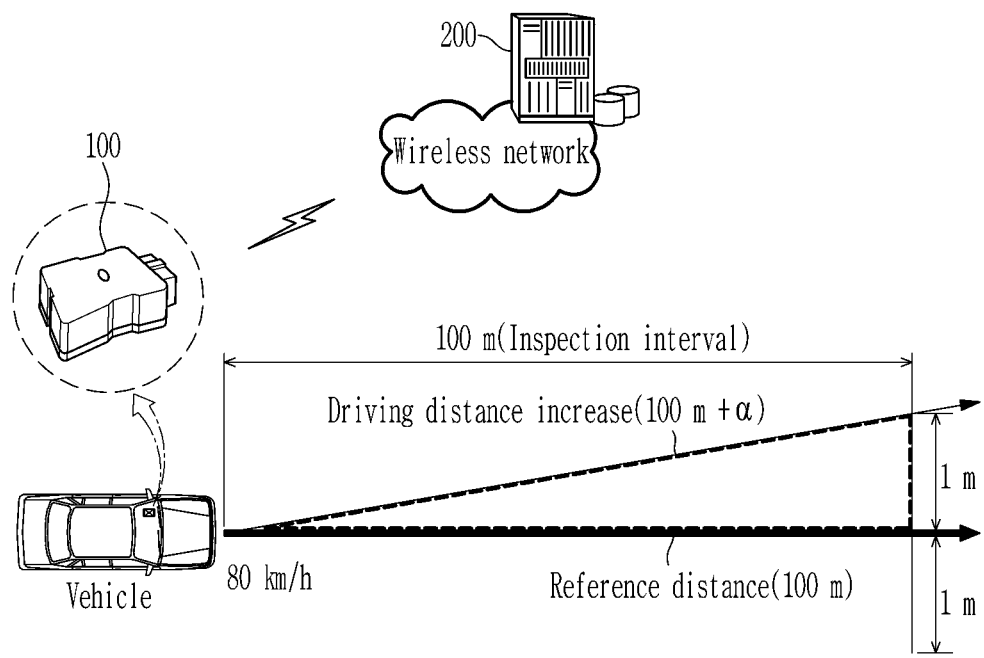
FIG. 2 illustrates a schematic view for explaining a vehicle lean inspection method according to an exemplary form of the present disclosure.

FIG. 2 illustrates a schematic view for explaining a vehicle lean inspection method according to an exemplary form of the present disclosure.

Referring to FIG. 2, in a vehicle manufacturing plant, a lean inspection apparatus 100 is loaded in a vehicle that has completed a steering wheel leveling operation and a wheel alignment operation to check whether a vehicle lean occurs during a driving test.

A vehicle leaning evaluation criterion according to an exemplary form of the present disclosure is one in which, after the vehicle drives at a reference distance (for example, 100 m) at a constant speed (for example, 80 Km/h) in a state where a steering angle of a steering wheel is center-aligned at 0 degrees, vehicle leaning is determined when the traveled distance (for example, 100 m+a) exceeds the reference distance. That is, as shown in FIG. 2, the vehicle does not drive straight ahead along the reference distance of the inspection interval, that is, the vehicle leans to either of the left and right sides and travels, so that the traveled distance increases, and by detecting the increased traveled distance, it is possible to determines whether or not the vehicle leans. Here, the speed (constant speed) and the reference distance of the vehicle in the vehicle leaning evaluation criterion are not limited to the exemplified values and may be changed.

However, the vehicle leaning evaluation criterion is based on the assumption that a steering angle value of the steering wheel is zero degrees and there is no slope of the road, but actually, since there is arbitrary manipulation of the steering wheel by the operator and a variable peripheral environment such as a road slope, they should be removed.

Therefore, the lean inspection apparatus 100 according to the exemplary form of the present disclosure is provided with an algorithm for removing the variables of the distance increase due to the steering angle variation and the slope of the road, in order to improve accuracy of the vehicle leaning inspection.

That is, the lean inspection apparatus 100 collects state information of the vehicle and measures an actual distance (AD) after passing through an inspection interval (for example, 100 m) at a constant speed (for example, 80 Km/h). It is possible to determine that the vehicle lean exists when the remaining driving distance D obtained by subtracting a first distance increment amount S depending on the steering wheel operation and a second distance increment amount R depending on the road slope from the actual distance AD is smaller than the reference distance (for example, 100 m).

In addition, the lean inspection apparatus 100 may transmit inspection information of a corresponding vehicle by wireless communication to an external inspection server 200 by including a wireless communication module.

The inspection server 200 matches vehicle-specific identification information (e.g., a VIN) with identification information (ID) of the lean inspection apparatus 100, and manages an inspection history of each vehicle by using a centrally managed computing system. The inspection server 200 manages an operation state of the lean inspection apparatus 100, and may include a processor and a program capable of performing the same functions as the lean inspection apparatus 100 described later.

Figure 3:
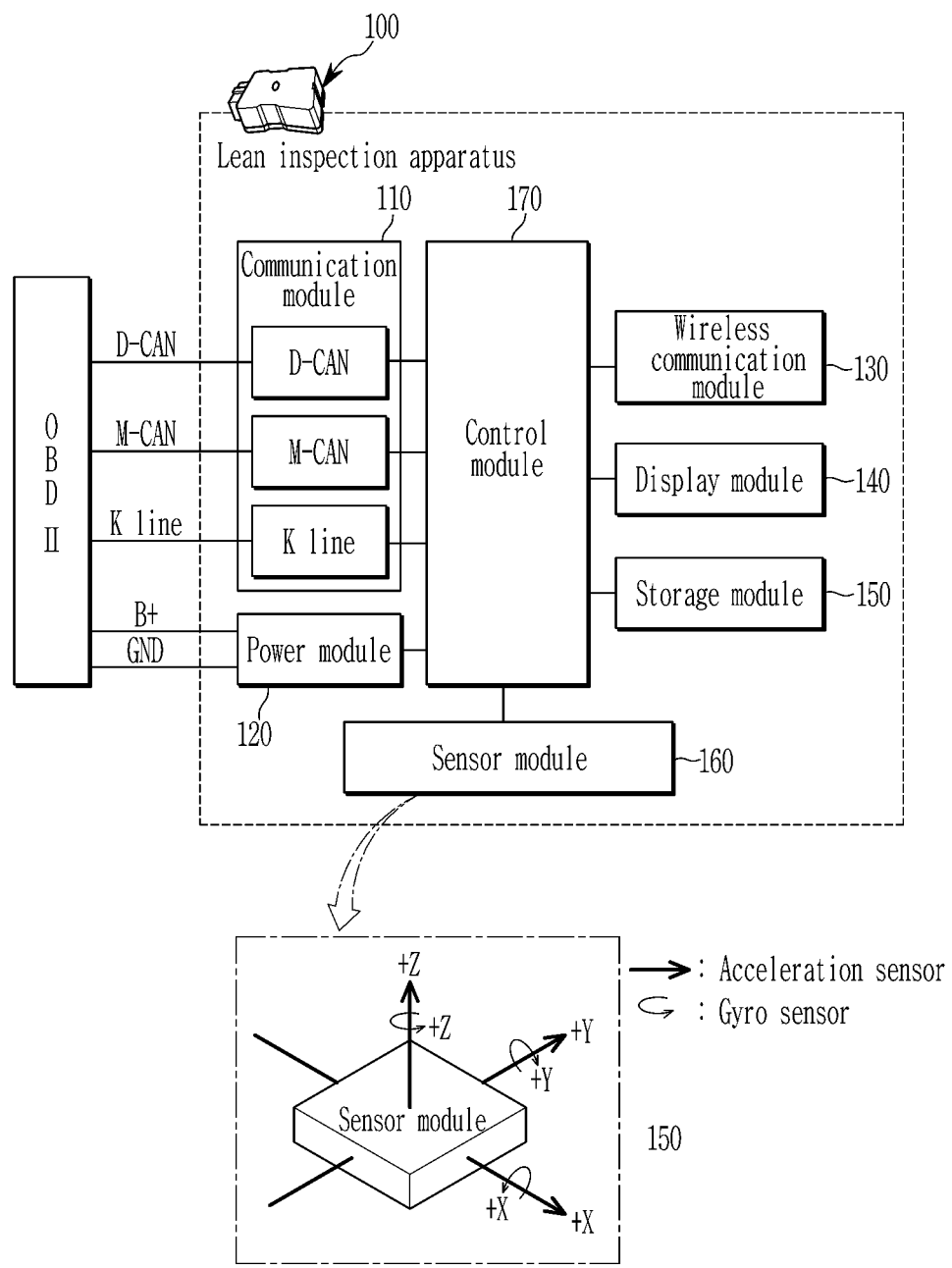
FIG. 3 illustrates a block diagram of a vehicle lean inspection apparatus according to an exemplary form of the present disclosure.

FIG. 3 illustrates a block diagram of a vehicle lean inspection apparatus according to an exemplary form of the present disclosure.

Referring to FIG. 3, the leaning inspection apparatus 100 includes a communication module 110, a power module 120, a wireless communication module 130, a display module 140, a storage module 150, a sensor module 160, and a control module 170.

The communication module 110 is connected to a diagnostic communication module through an OBD-II (on-board diagnostics-II) connector of the vehicle, and collects state information according to the driving of the vehicle. Here, the diagnostic communication includes CAN communication of D-CAN and M-CAN, and a K-line. The state information may include a steering angle sensor value (hereinafter referred to as a steering angle) of the steering wheel and a speed value of a four-wheel speed sensors of the vehicle, which are referred to in the checking of a leaning variable parameter of the vehicle.

The power module 120 receives power through the OBD-II connector of the vehicle and supplies the power for driving the apparatus.

The communication module 110 and the power module 120 may be formed as an interface configured according to the OBD-II connector standard of the vehicle.

The wireless communication module 130 may transmit the leaning inspection information of the vehicle by connecting the wireless communication with the external inspection server 200. The leaning inspection information may include a vehicle leaning determination result and sensing information collected to determine whether the vehicle has leaned during the driving test.

The wireless communication may utilize at least one of short-range wireless communications such as Wi-Fi, wireless LAN, WPAN, and ZigBee, wireless Internet, and mobile communication.

The display module 140 displays information generated in accordance with an operation of the vehicle lean inspection apparatus 100 in at least one of visual and auditory modes. For this, the display module 140 may include at least one of a liquid crystal display (LCD), a light emitting diode (LED), a speaker, and a buzzer.

The storage module 150 stores various programs and data for the lean inspection of the vehicle, and stores various kinds of information generated according to the operation of the lean inspection apparatus 100.

The storage module 150 may include a memory, and stores a first distance variation map according to a steering angle change of the steering wheel and a second distance variation map according to a slope change of the road. The first distance variation map and the second distance variation map may be set through experiments, programs, and probability models according to respective corresponding variables.

The sensor module 160 includes an acceleration sensor and a gyro sensor, which may be configured as a single chip or may be individually configured. The acceleration sensor may measure an acceleration signal due to a vertical vibration during driving, and the gyro sensor may measure a road slope during driving.

The control module 170 may be configured as an MCU (microcontroller unit), and controls an overall operation for the vehicle lean inspection according to the exemplary form of the present disclosure.

The control module 170 recognizes an inspection start time and an inspection end time when the driving vehicle passes through the inspection interval (100 m) by using the acceleration sensor, and grasps a driving time T of the inspection interval.

Figure 4:
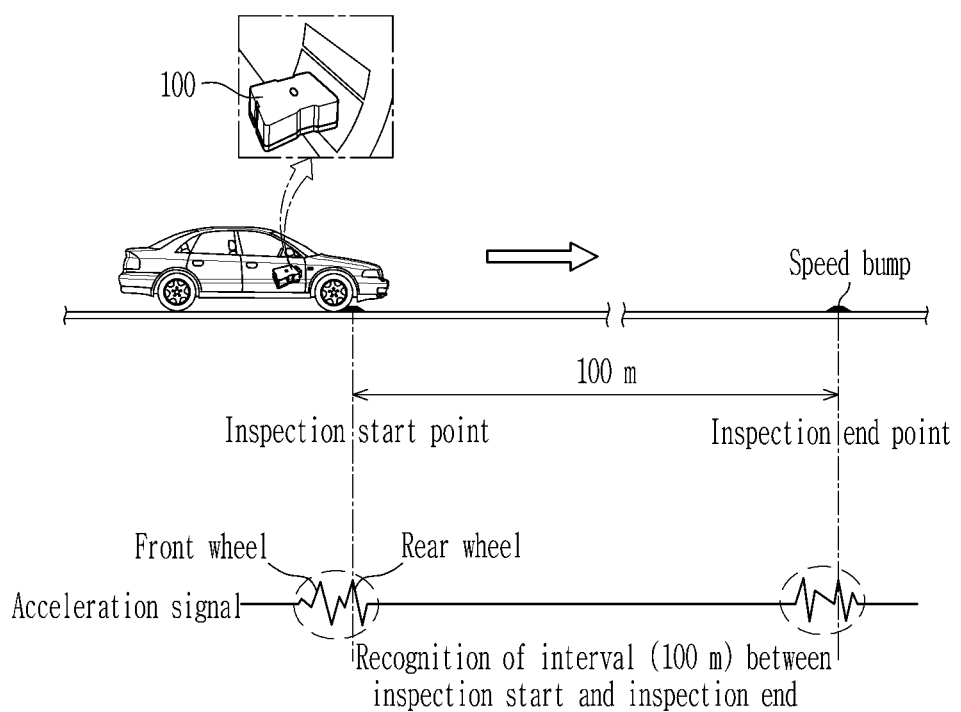
FIG. 4 illustrates a method of determining a driving time of an inspection interval of a vehicle using an acceleration sensor according to an exemplary form of the present disclosure.

FIG. 4 illustrates a method of determining the driving time of the inspection interval of the vehicle using the acceleration sensor according to the exemplary form of the present disclosure.

Referring to FIG. 4, when the inspection interval is assumed to be approximately 100 m, a speed bump is formed in a lateral direction of the road at each of an inspection start point and an inspection end point.

The control module 170 recognizes an acceleration signal generated when front and rear wheels of the vehicle respectively pass the inspection start point and the inspection end point at which the speed bumps are formed through the acceleration sensor, so that it confirms that the vehicle has passed through the inspection interval, thereby measuring the driving time T. In this case, the control module 170 starts the vehicle lean inspection at the start time of the vehicle entering the start point and ends the vehicle lean inspection at the end time of the vehicle passing the end point.

That is, the control module 170 collects the state information of the vehicle and the slope information of the road during the driving time T, and analyzes whether the vehicle is leaning based on the information.

Figure 5:
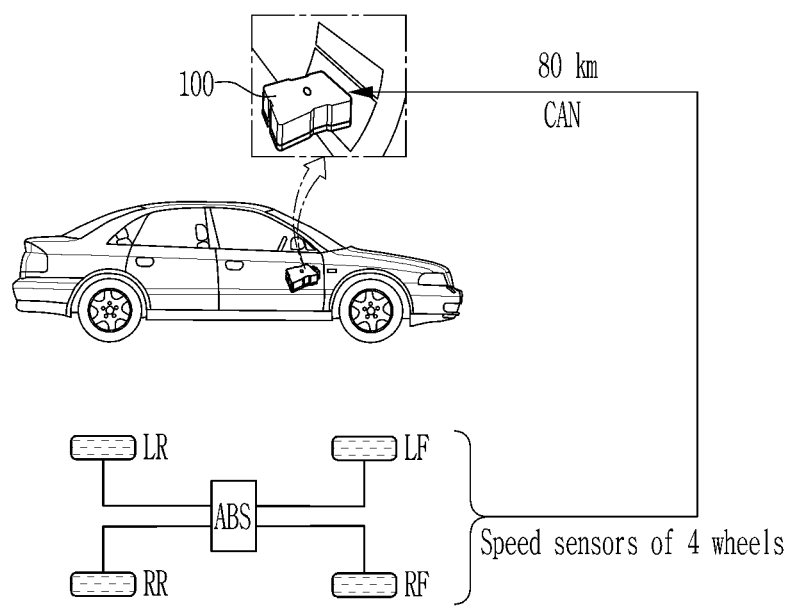
FIG. 5 illustrates a method of measuring a vehicle speed according to an exemplary form of the present disclosure.

FIG. 5 illustrates a method of measuring a vehicle speed according to an exemplary form of the present disclosure.

Referring to FIG. 5, the control module 170 collects speed values of speed sensors of four-wheels LF, RF, LR, and RR of the vehicle during the driving time T, and calculates an average of the speed values to derive an average speed V of the vehicle passing through the inspection interval (100 m).

Here, the reason for calculating the vehicle speed with the speed values of the speed sensors of the four wheels is to diagnose a wheel alignment failure with respect to the four wheels LF, RF, LR, and RR of the vehicle in which the lean occurs. For example, the control module 170 may compare the speed values of the speed sensors of the four wheels collected from the vehicle in which the lean occurs with the average speed to detect tow and camber setting failures of the wheels in descending order of deviation occurrence.

On the other hand, the control module 170 may calculate the actual driving distance AD of the vehicle passing through the inspection interval (100 m) by multiplying the driving time T by the average speed V.

The control module 170 collects the steering angle change of the steering wheel during the driving time T, and derives the first distance increment S according to the steering angle change with reference to the first distance variation map.

Figure 6:
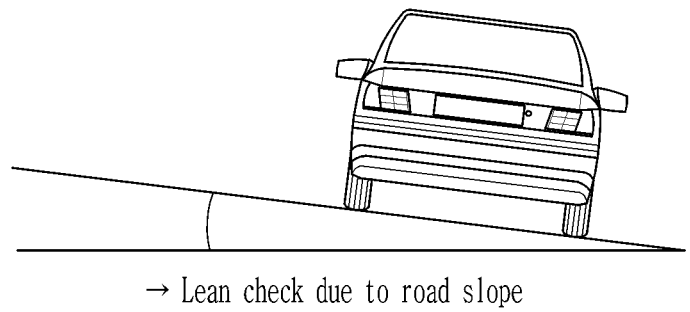
FIG. 6 illustrates a method of checking a vehicle lean depending on a road slope according to an exemplary form of the present disclosure.

FIG. 6 illustrates a method of checking a vehicle lean depending on a road slope in an exemplary form of the present disclosure.

Referring to FIG. 6, when there is a slope on the road, since the driving vehicle generally leans in a sloped direction, a variable related thereto should be eliminated.

Therefore, the control module 170 collects the slope change of the road through the gyro sensor during the driving time T, and derives the second distance increment R according to the slope change with reference to the second distance variation map.

When all correction values for eliminating various environmental variables generated during the vehicle lean inspection are derived, the driving distance D is calculated through a lean measurement formula ((V*T)−S−R=D). Here, the value obtained by multiplying the average speed V by the driving time T may be an actual driving distance AD passing through the inspection interval (100 m), and may include various surrounding environmental variables.

Therefore, the control module 170 subtracts the first distance increment S according to the steering wheel operation and the second distance increment R according to the road slope from the actual driving distance AD corresponding to a distance for the vehicle to pass through the inspection interval (100 m) (D), thereby eliminating the environmental variables.

In addition, the control module 170 compares the driving distance D with the reference distance (100 m) of the inspection interval, and when the driving distance D exceeds the reference distance (100 m), it may determine that the lean occurs. In this case, the reference distance may be compared with a tolerance of a predetermined length. Thereafter, the control module 170 transmits the determination result of the vehicle lean to the inspection server 200 through the wireless communication.

As described above, the vehicle lean inspection apparatus 100 is described as a separate inspection apparatus connected through the OBD-II connector of the vehicle, but the present disclosure is not limited thereto, and the vehicle lean inspection apparatus 100 may be configured by adding the hardware and software according to the exemplary form of the present disclosure described above to the conventional wireless OBD device.

Hereinafter, a vehicle lean inspection method according to an exemplary form of the present disclosure will be described with reference to FIG. 7 based on the above description. Since each detailed configuration described for each function may be integrated into one apparatus, in explaining the vehicle lean inspection method, the subject matter of the following description will be the lean inspection apparatus 100.

Figure 7:
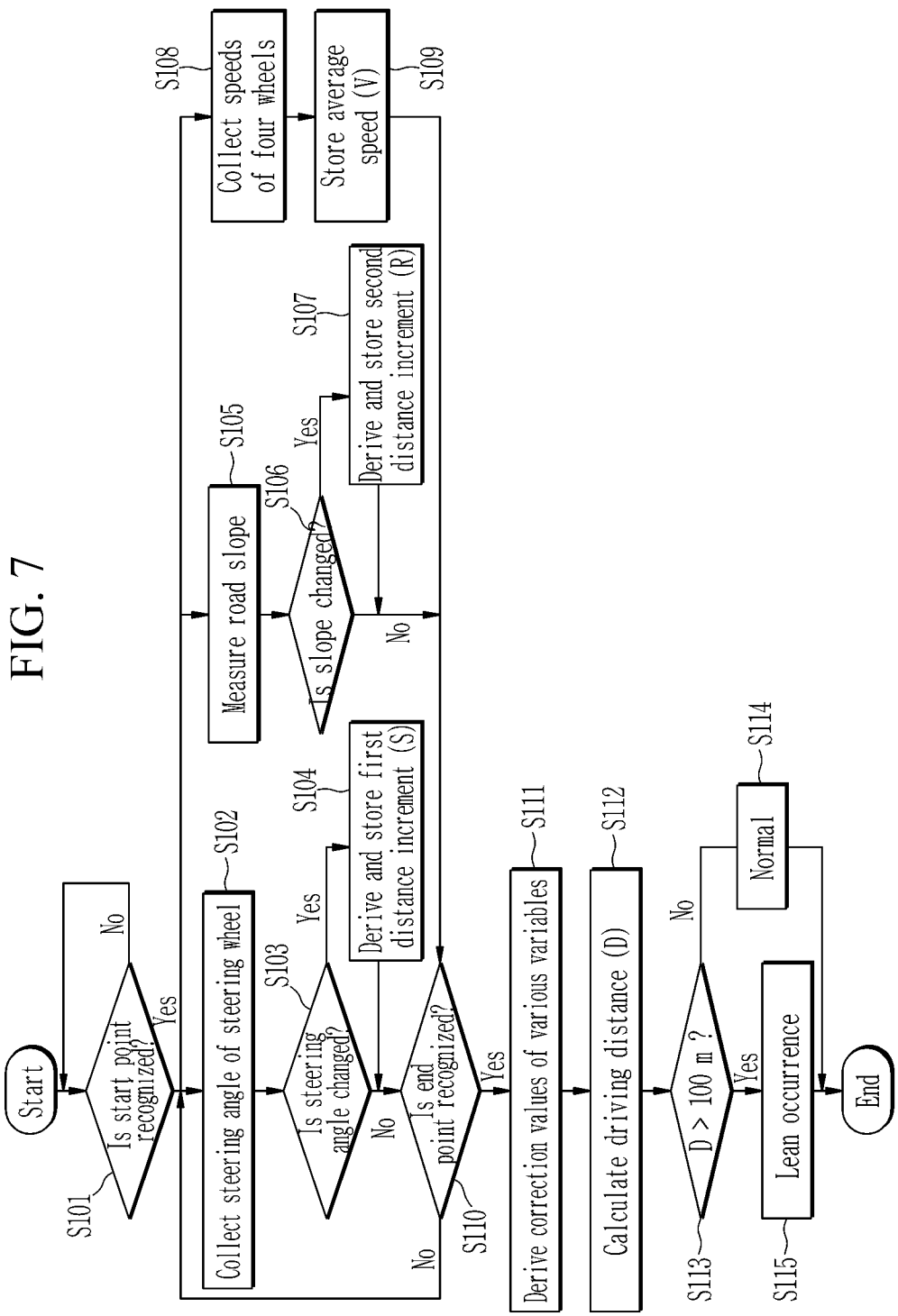
FIG. 7 illustrates a flowchart of a vehicle lean inspection method according to an exemplary form of the present disclosure.

FIG. 7 illustrates a flowchart of a vehicle lean inspection method in one form of the present disclosure.

Referring to FIG. 7, the vehicle lean inspection apparatus 100 is mounted on the OBD-II connector of the vehicle, and waits for a driving test for a lean inspection. In this case, the lean inspection apparatus 100 may connect the wireless communication module with the external inspection server 200, and may allow the external inspection server 200 to recognize its own ID and vehicle identification information by transmitting them.

Then, the vehicle drives toward the inspection interval (100 m) at a steering angle of a zero-degree reference and a constant speed for the driving inspection (S101; No).

When the lean inspection apparatus 100 recognizes that the vehicle enters the inspection start point of the vehicle through the signal of the acceleration sensor (S101; Yes), the lean inspection apparatus 100 collects the vehicle state information desired for the lean inspection and measures the road slope through the gyro sensor.

The lean inspection apparatus 100 collects the steering angle of the steering wheel (S102), and checks whether steering angle changes based on 0 degrees (S103). In this case, if there is no change in the steering angle (S103: No), the lean inspection apparatus 100 continuously checks the changes in the steering angle collected until the end of the driving inspection. On the other hand, if a steering angle change occurs (S103; Yes), the lean inspection apparatus 100 derives and stores the first distance increment S according to the steering angle change (S104).

In addition, the lean inspection apparatus 100 measures the slope of the road on which the vehicle drives through the gyro sensor (S105), and checks whether the slope is changed on the basis of the horizontal (S106). In this case, if there is no change in the slope (S106: No), the lean inspection apparatus 100 continuously checks the changes in the slope until the end of the driving inspection. On the other hand, if a slope change occurs (S106; Yes), the lean inspection apparatus 100 derives and stores the second distance increment R according to the slope change (S107).

The lean inspection apparatus 100 collects the speed values of the speed sensors of the four wheels LF, RF, LR, and RR of the vehicle (S108), and calculates and stores an average of the speed values of the speed sensors of the four wheels (S109). This average speed V is continuously calculated until it is recognized that the vehicle passes the end point.

When the lean inspection apparatus 100 recognizes that the vehicle passes through the inspection end point of the vehicle through the signal of the acceleration sensor (S110; Yes), the lean inspection apparatus 100 ends the collection of the state information of the vehicle and the measurement of the road slope, and derives various correction values desired for the determination of the lean (S111).

In this case, the lean inspection apparatus 100 multiplies the driving time T until the vehicle passes the inspection end point from the inspection start point and the average speed V, thereby deriving the actual driving distance AD corresponding to a distance that the vehicle actually drives the reference inspection interval (100 m).

In addition, the first distance increment S according to the steering angle change of the steering wheel accumulated during the driving time T and the second distance increment R according to the slope change of the road may be derived.

The lean inspection apparatus 100 subtracts the first distance increment S according to the steering wheel operation and the second distance increment R according to the road slope from the actual driving distance AD, thereby calculating the driving distance from which various variables are eliminated (S112).

When the driving distance D does not exceed the reference distance (100 m) (S113; No), the lean inspection apparatus 100 determines that steering and wheel alignment of the vehicle are properly set (S114).

When the driving distance D exceeds the reference distance (100 m) (S113; No), the lean inspection apparatus 100 determines that the lean of the vehicle occurs (S115).

Thereafter, the lean inspection apparatus 100 transmits the determination result for the lean of the vehicle to the inspection server 200 through the wireless communication.

The inspection server 200 stores the lean inspection history of the vehicle, extracts the vehicle of which the lean has occurred, performs centering of the steering wheel and checking of the wheel alignment, and controls the lean inspection process to be re-performed.

As described above, in the exemplary forms of the present disclosure, it is possible to improve accuracy of the lean inspection by eliminating the measurement error due to the environmental variables such as the steering wheel operation of the operator and the road slope during the lean inspection of the vehicle.

In addition, it is possible to reduce inspection costs by implementing a high-precision lean inspection apparatus by adding only the acceleration sensor, the gyro sensor, and the vehicle lean algorithm to the OBD device used in the production line of the vehicle.

Further, when the lean algorithm of the lean inspection apparatus is installed in a typical vehicle or an autonomous vehicle, by self-diagnosing a lean event due to an abnormality of the steering wheel and wheel alignment while the vehicle is driving and by alerting the lean event to the driver and by transmitting it to a control center, it is possible to improve customer's satisfaction through A/S service.

While the exemplary forms of the present disclosure have been described above, the present disclosure is not limited to the above exemplary forms, and may be variously changed.

For example, in the exemplary form of the present disclosure described above, it has been described that the lean inspection apparatus 100 is provided with the algorithm for eliminating the surrounding environmental variables during the lean inspection of the vehicle, and transmits the inspection result to the external inspection server 200.

However, the exemplary form of the present disclosure is not limited thereto, and the inspection server 200 may be provided with the algorithm and collect the steering angle of the steering wheel and the road slope by the wireless communication through the lean inspection apparatus 100, and a central control center may determine whether each vehicle leans.

In the exemplary form of the present disclosure described above, the feature of eliminating the variable according to the steering angle variation and the road slope change has been mainly described, but the present disclosure is not limited thereto, and it is possible to determine whether or not the vehicle leans by further eliminating a third distance increment according to a lateral acceleration applied to the vehicle body by wind.

In this case, the lean inspection apparatus 100 may collect state information that further includes the lateral acceleration measured by the lateral wind applied to the vehicle body, from the vehicle. The third distance increase can be derived with reference to the third distance variation map according to change of the lateral acceleration and subtracted from the actual driving distance.

Therefore, it is possible to perform more precise lean measurement in which the variable due to the lateral wind is further eliminated.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A lean inspection apparatus for a vehicle that determines whether the vehicle is leaning during a driving test of the vehicle, the lean inspection apparatus comprising: a communication module configured to be connected to a diagnostic communication module through an on-board diagnostics-II (OBD-II) connector of the vehicle and to collect state information based on driving of the vehicle; an acceleration sensor configured to measure an acceleration signal generated by a vertical vibration during the driving of the vehicle to determine a start point and an end point of an inspection interval with a predetermined reference distance; a gyro sensor configured to measure a road slope during the driving of the vehicle; and a controller configured to receive the state information and measure an actual driving distance passing through the inspection interval, and configured to determine that the vehicle leans when a remaining driven distance exceeds the predetermined reference distance, wherein the remaining driven distance is calculated by subtracting a first distance increment due to an operation of a steering wheel and a second distance increment due to the road slope from the actual driving distance.

2. The lean inspection apparatus of claim 1, wherein
the state information includes a steering angle of the steering wheel, and speed values of four wheel speed sensors of the vehicle.

3. The lean inspection apparatus of claim 1, wherein a first speed bump is formed at the start point of the inspection interval, and a second speed bump is formed at the end point of the inspection interval,
the controller is configured to determine the start point and the end point of the inspection interval using the acceleration sensor configured to measure acceleration signals when the vehicle passes over the first and second speed bumps, and the controller is configured to calculate a driving time in which the vehicle passes through the inspection interval based on the measured acceleration signals.

4. The lean inspection apparatus of claim 3, wherein the controller is configured to calculate an average speed value of speed values of four wheel speed sensors of the vehicle collected during the driving time.

5. The lean inspection apparatus of claim 4, wherein
the controller is configured to calculate the actual driving distance by multiplying the driving time by the average speed value.

6. The lean inspection apparatus of claim 4, wherein
the controller is configured to compare each speed value of the four wheel speed sensors with the average speed value of the four wheel speed sensors when the vehicle is determined as being leaning, and
wherein the controller is configured to calculate a deviation between each speed value and the average speed value of the four wheel speed sensors and to diagnose a wheel alignment failure based on the calculated deviations.

7. The lean inspection apparatus of claim 1, further comprising:
a power module configured to receive power through the OBD-II connector and supply the power to operate the lean inspection apparatus;
a wireless communication module configured to transmit inspection information of the vehicle to an external inspection server;
a display module configured to display the inspection information via at least one of a visual signal or auditory signal; and
a storage module configured to store a first distance variation map based on a steering angle change of the steering wheel and a second distance variation map based on a road slope change.

8. The lean inspection apparatus of claim 7, wherein
the controller is configured to collect the steering angle change of the steering wheel during the driving time in which the vehicle passes through the inspection interval, and to derive the first distance increment based on the steering angle change with reference to the first distance variation map.

9. The lean inspection apparatus of claim 7, wherein the controller is configured to collect the road slope change during the driving time in which the vehicle passes through the inspection interval, and to derive the second distance increment based on the road slope change with reference to the second distance variation map.

10. The lean inspection apparatus of claim 1, wherein
a hardware and a software of the lean inspection apparatus are additionally installed in a wireless OBD device.

11. The lean inspection apparatus of claim 1, wherein
the controller is configured to collect a lateral acceleration of the vehicle, derive a third distance increment due to a change of the lateral acceleration, and subtract the third distance increment from the actual driving distance.

12. A leaning inspection method for a vehicle that determines whether the vehicle is leaning during a driving test of the vehicle by using a lean inspection apparatus connected to an on-board diagnostics-II (OBD-II) connector of the vehicle, the method comprising:
when an entrance of an inspection start point of the vehicle is recognized, collecting state information of the vehicle and measuring a road slope through a gyro sensor;
calculating, by a controller, a first distance increment based on a change of a steering angle of a steering wheel of the vehicle, and calculating a second distance increment based on a change of the road slope;
when a passing of an inspection end point of the vehicle is recognized, calculating, by the controller, an actual driving distance that the vehicle has driven through a reference inspection interval by multiplying a driving time by an average speed value of the vehicle; and
determining, by the controller, the leaning of the vehicle when a remaining driven distance calculated by subtracting the first distance increment and the second distance increment from the actual driving distance exceeds a reference distance.

13. The lean inspection method of claim 12, wherein
the entrance of the inspection start point and the passing of the inspection end point of the vehicle are recognized by detecting acceleration signals generated when front and rear wheels of the vehicle respectively pass through the inspection start point and the inspection end point at which respective speed bumps are formed.

14. The lean inspection method of claim 12, wherein
the calculating the first distance increment includes:
collecting the steering angle of the steering wheel and checking whether the steering angle is changed with respect to a zero (0) degree; and
calculating the first distance increment with reference to a first distance variation map based on the change of the steering angle of the steering wheel when the steering angle is changed.

15. The lean inspection method of claim 12, wherein
the calculating the second distance increment includes:
measuring a slope of a road on which the vehicle is driving through the gyro sensor; and
calculating the second distance increment with reference to a second distance variation map based on the change of the road slope when the road slope is changed.

16. The lean inspection method of claim 12, wherein
the calculating the actual driving distance includes calculating an average speed value of speed values of four wheel speed sensors of the vehicle collected during the driving time.

17. The lean inspection method of claim 16, wherein
the determining the leaning of the vehicle includes calculating a deviation between each speed value and the average speed value of the four wheel speed sensors, and diagnosing a failure of a wheel alignment based on the calculated deviations.

18. The lean inspection method of claim 12, wherein
the reference distance is compared with the remaining driving distance with a permissible range of a predetermined length.

19. The lean inspection method of claim 12, further comprising,
after determining the leaning of the vehicle, transmitting a determination result of the leaning of the vehicle to an external inspection server through wireless communication.

* * * * *